Oct. 13, 1953　　　G. R. SQUIBB ET AL　　　2,654,977
PROCESS AND APPARATUS FOR GRINDING PISTON RINGS
Filed May 3, 1951　　　　　　　　　　　　　　　　6 Sheets-Sheet 1

Inventors
George R. Squibb &
Donald A. Urquhart
By
Willits, Helmig & Caillio
Attorneys

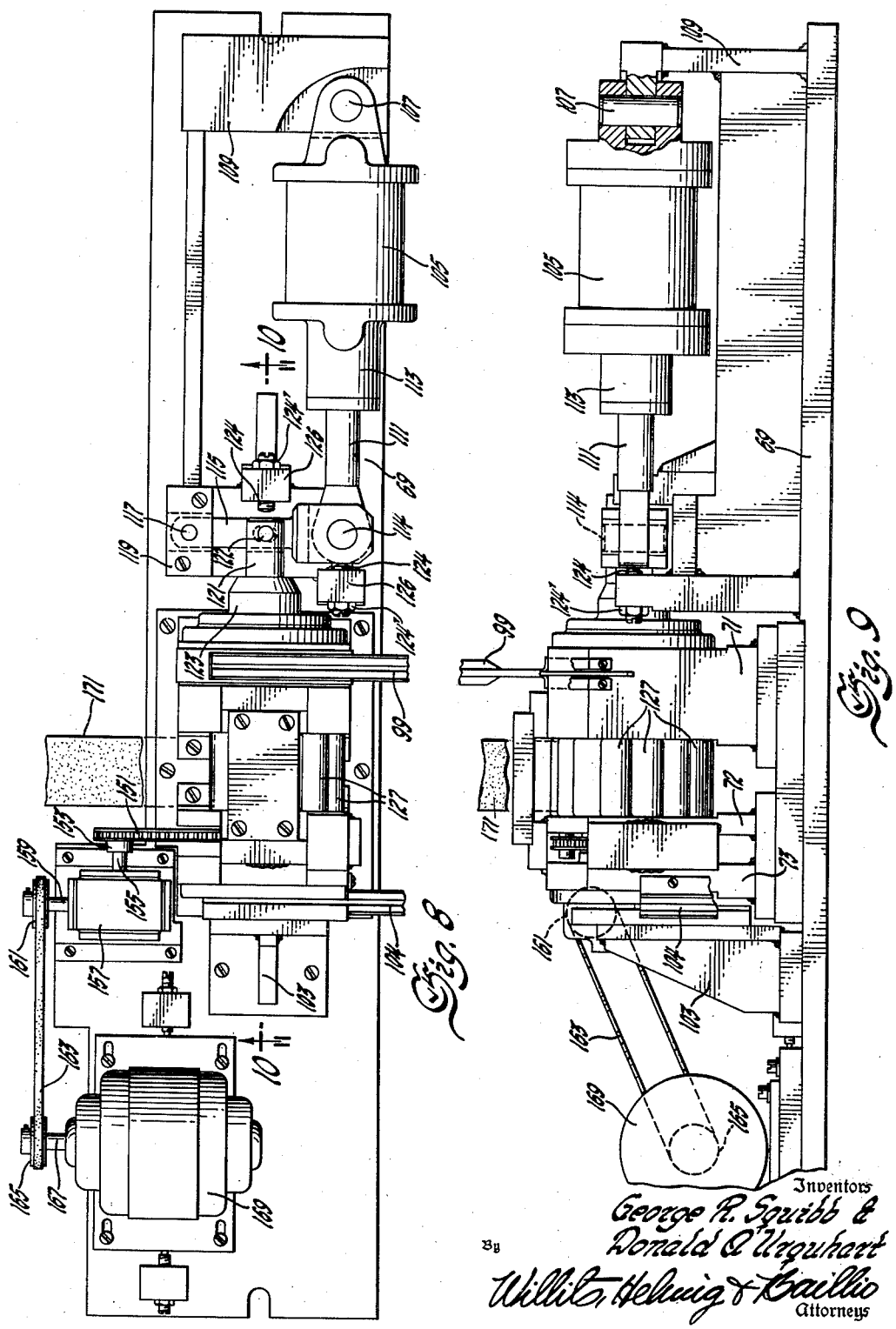

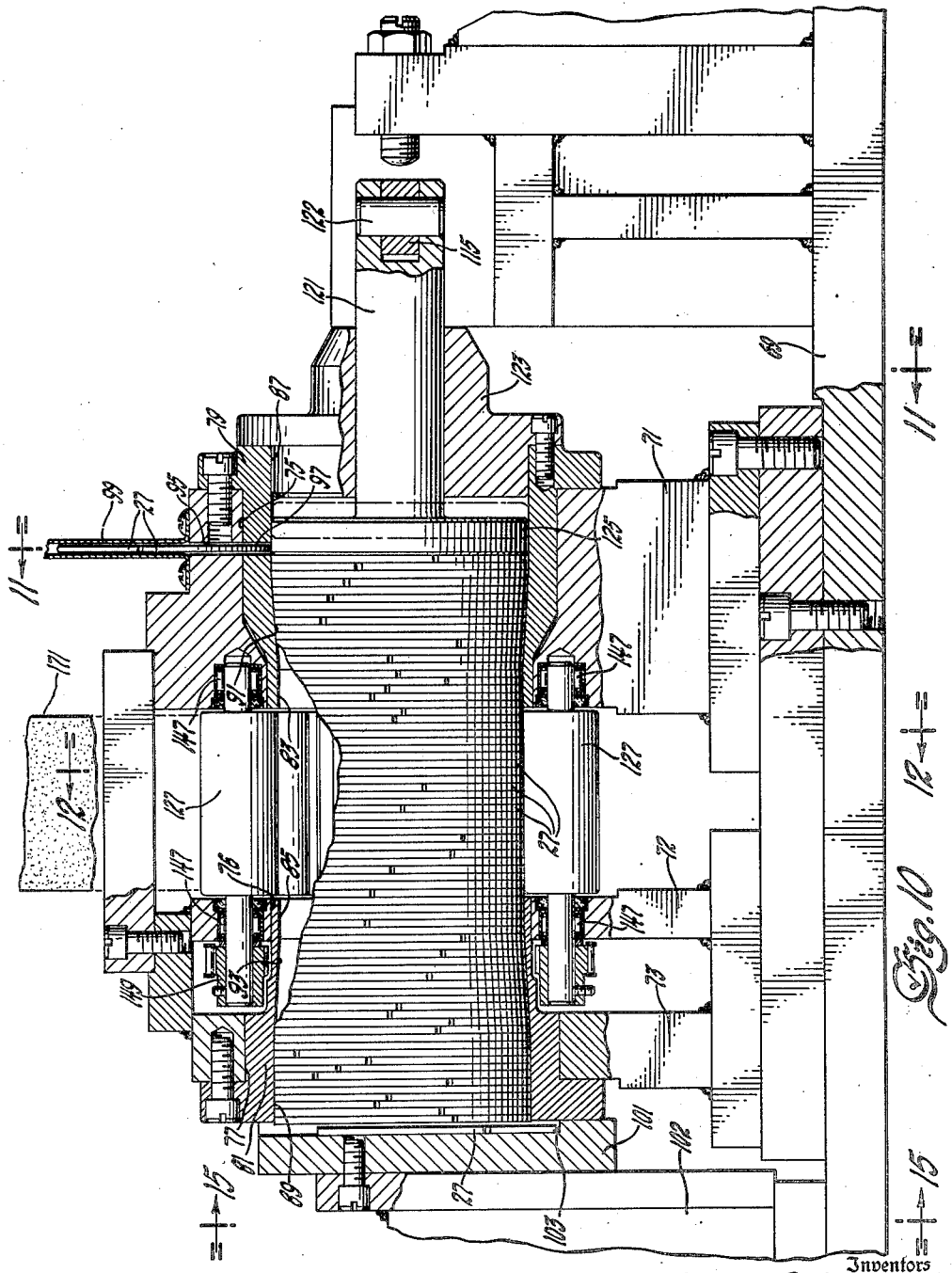

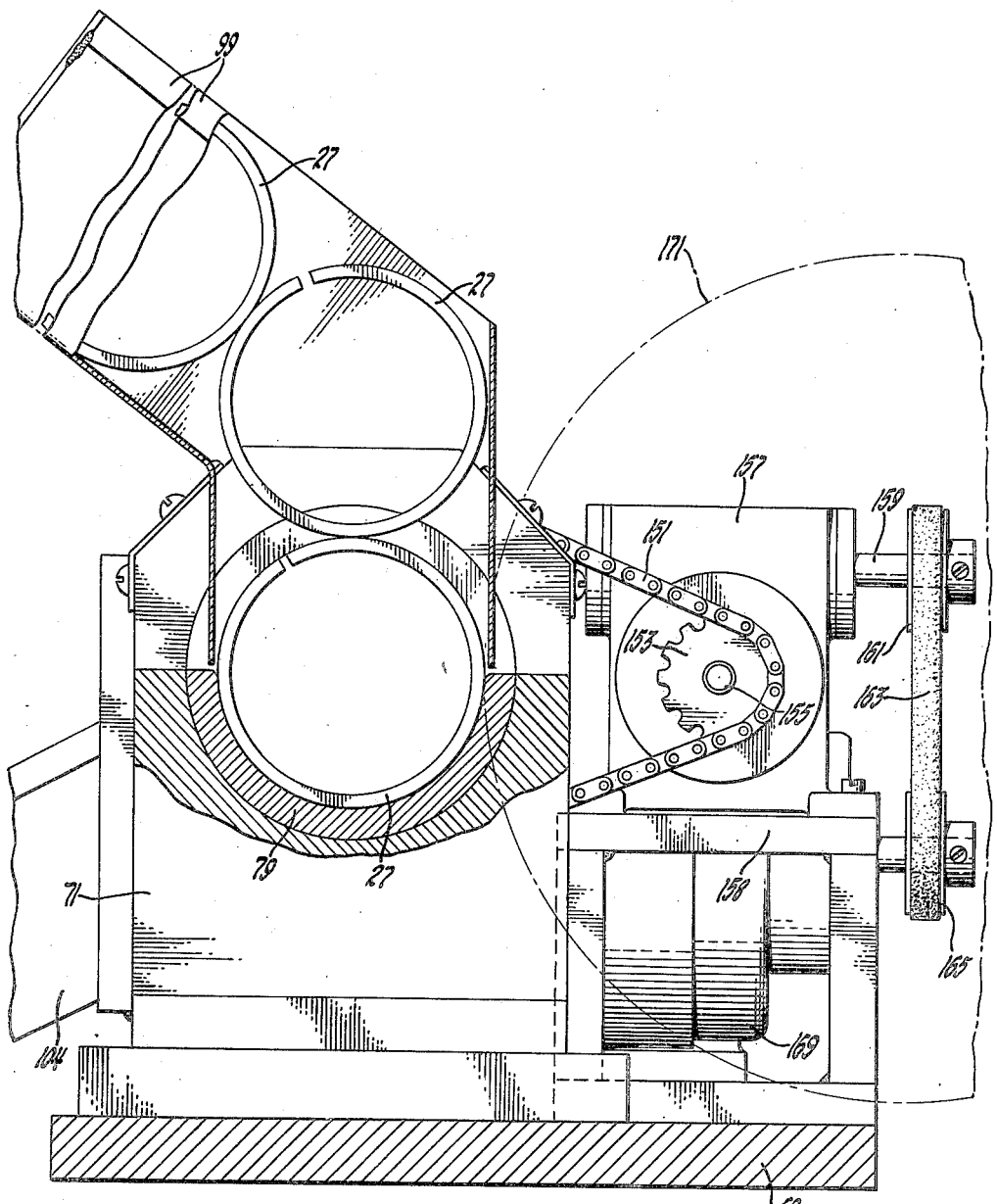

Oct. 13, 1953  G. R. SQUIBB ET AL  2,654,977
PROCESS AND APPARATUS FOR GRINDING PISTON RINGS
Filed May 3, 1951  6 Sheets-Sheet 5

Inventors
George R. Squibb &
Donald O. Urquhart
By Willits, Helwig & Baillie
Attorneys

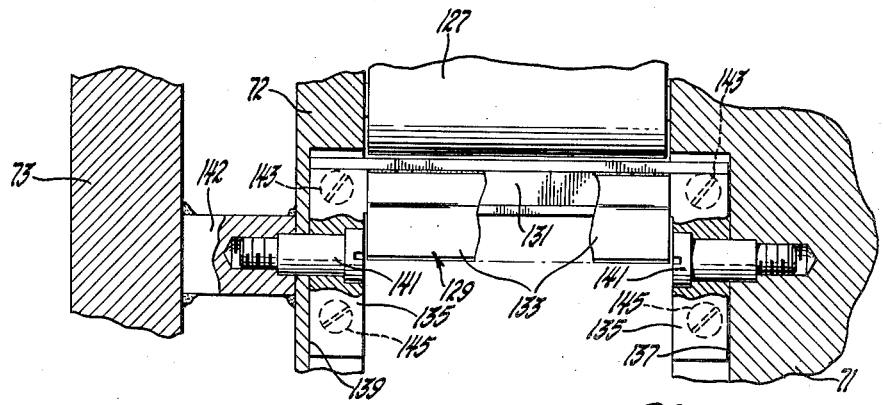
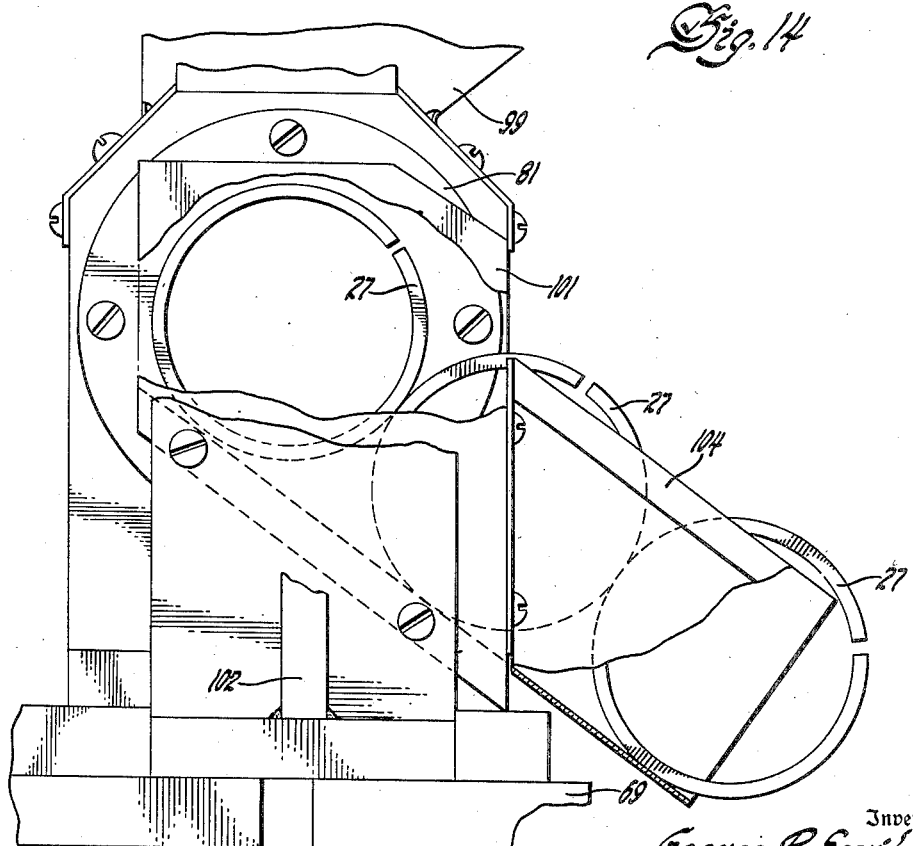

Patented Oct. 13, 1953

2,654,977

UNITED STATES PATENT OFFICE 2,654,977

PROCESS AND APPARATUS FOR GRINDING PISTON RINGS

George R. Squibb and Donald Allen Urquhart, Birmingham, Mich., assignors to General Motors Corporation, Detroit, Mich., a corporation of Delaware Application May 3, 1951, Serial No. 224,368

11 Claims. (Cl. 51—103)

This invention relates to a process and apparatus for forming split, resilient packing rings.

The principal object of the invention is to provide a simple process and apparatus for carrying out certain steps in the process for forming split, resilient packing rings whereby the external peripheral surface of the rings resiliently engage the internal wall of a cylinder in uniform sealing engagement and whereby the side surfaces of the rings uniformly engage the walls of grooves in a piston movable in the cylinder.

The steps in the process and apparatus for performing certain of the steps in this process by which this object is accomplished together with other novel features of the invention will become apparent by reference to the following detailed description of the process and drawings illustrating apparatus for carrying out steps in this process.

Figure 1 of the drawings is a schematic view of apparatus for rolling of steel wire ring stock into rectangular form.

Figure 8 is a plan view of apparatus with parts shown broken away for successively contracting the rings into a true form and abrading the external peripheral ring surfaces to a true cylindrical form.

Figure 9 is a side elevation view of the apparatus shown in Figure 8 with parts shown broken away and in section.

Figure 10 is an enlarged, longitudinal sectional view taken on line 10—10 of Figure 8 with parts shown broken away and in section.

Figure 11 is a transverse, sectional view taken on line 11—11 of Figure 10 with parts shown broken away and in section.

Figure 14 is a sectional view taken on line 14—14 of Figure 12 with parts shown broken away and in section.

Figure 15 is an end elevation view taken on line 15—15 of Figure 10 with parts shown broken away and in section.

Figure 1:
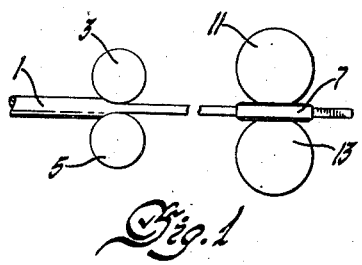

As best illustrated in Figure 1, round steel wire stock 1 is flattened by passage through a pair of rollers 3 and 5 rotatable on horizontal axes and is then passed through two pairs of rollers, one roller 7 of a pair of rollers being shown rotatable about horizontal axes and the other pair of rollers 11 and 13 being mounted on vertical axes in the same plane to form a rectangular wire section.

Figure 2:
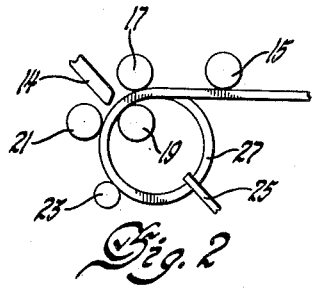
Figure 2 is a schematic view of apparatus for coiling the rolled ring stock and shearing each coil to form a resilient split ring.

The rectangular steel wire is then passed through a wire coiling and shearing apparatus, shown in Figure 2, having a bending lug 14 for starting the wire, and bending, guiding and presetting rollers 15, 17, 19, 21 and 23 rotatable about stationary axles to form a circular coil or ring. A shearing tool 25 shears off each coil to form a resilient split ring 27 of circular form.

Figure 3:
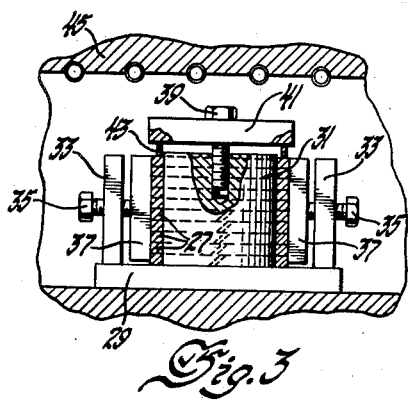
Figure 3 is a schematic view of apparatus for deflecting the split, resilient rings into oval form with flat sides and for heating the deflected rings to retain the rings in the form deflected.

The split rings 27 are next deflected and heat-set by means of the apparatus, shown in Figure 3. This apparatus includes a frame having a base plate 29 having an upstanding mandrel 31 of oval form secured thereon. The base plate 29 is also provided with upstanding lugs 33 disposed in a circle around the vertical center line of the mandrel. Each of the lugs 33 is provided with a threaded opening extending radially therethrough with respect to the center line of the mandrel 31 and a clamp screw 35 is threaded through each of the threaded openings in the lugs and a vertical clamp plate 37 is supported on the inner end of each clamp screw 35 adjacent the mandrel surface. The mandrel 31 is also provided with a threaded, vertical opening in the upper end face, located on the center line, and a clamp screw 39 extending through an opening in an upper clamping plate 41 is threaded in this mandrel opening. The clamping plate 41 is provided with an annular flange 43 on the lower face, having an internal diameter slightly larger than the mandrel 31. A plurality of split, resilient rings 27 are shown stacked on the mandrel 31 with the ring gaps in vertical alignment, as shown by the dotted lines in Figure 3, adjacent the portion of the mandrel surface having the minimum radius of curvature. The portion of the mandrel surface opposite the ring gaps has the maximum radius of curvature and the radius of curvature decreases progressively from this point toward each end of the rings to the point of minimum radius of curvature of the oval mandrel surface adjacent the aligned ring gaps. With the rings 27 stacked on the mandrel 31 the upper clamping plate 41 is drawn downwardly by tightening the vertical clamping screw 39 to cause the annular flange 43 thereon to engage the upper ring and deflect the sides of the stacked rings into parallel relation with flange 43 and the base plate 29. The radial clamping screw 35 adjacent the point of maximum radius of curvature of mandrel 31 is then initially tightened to engage the inner surfaces of the ring with the mandrel at this point and the radial clamping screws 35 either side of this are successively tightened toward the ends of the rings at the point of minimum radius of curvature of the mandrel surface adjacent the ring gaps. The rings 27 are accordingly deflected into the same oval form of the mandrel with the sides deflected between the flat base plate 29 and lower flat face of the annular flange 43 of the upper clamping plate 41 by means of the above described apparatus which is then inserted in a heat treating oven 45. The temperature at which the deflected rings are heated in this oven and the duration of heating thereof is such that the rings are heat-set to this deflected form.

Figure 4:
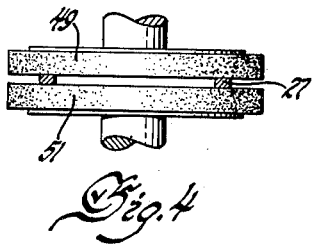
Figure 4 is a schematic view of apparatus for abrading the sides of the oval rings.

After heat-setting of the rings 27 each ring is placed between adjacent side surfaces of two grinding wheels 49 and 51, rotatable about a common axis, as shown in Figure 4, to abrade the opposite side surfaces of the ring so that these surfaces are flat and parallel.

Figure 5:
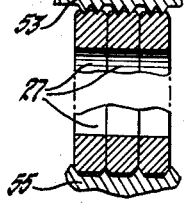
Figure 5 is a schematic view of apparatus for forming lubricating grooves in the external peripheral surface of the rings and for chamfering the edges of this surface.

The next step in the process is the forming of oil grooves in the external peripheral surface and chamfering the edges of this surface of the rings by means of the apparatus shown in Figure 5. The rings 27 are contracted into circular form in a suitable sleeve and clamped endwise on a suitable mandrel and the grooving and chamfering operation is performed by forming tools 53 and 55 engageable with the external peripheral surfaces of the rings with the mandrel rotating on centers.

Figure 6:
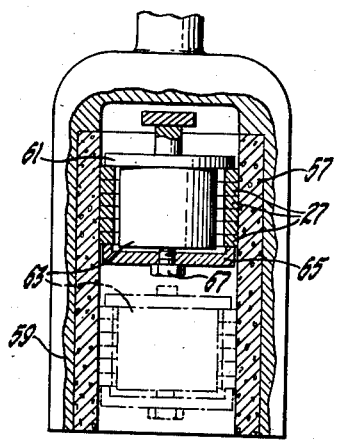
Figure 6 is a schematic view of one form of apparatus for contracting the rings to a true circular form and abrading a true cylindrical, external peripheral surface on the contracted rings.
Figure 7:
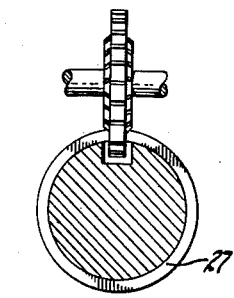
Figure 7 is a schematic view of apparatus for milling the end surfaces of the split rings.

A true cylindrical, external peripheral surface is next formed on the rings when contracted and held in circular form by the honing apparatus shown in Figure 6 or by apparatus shown in Figures 8 to 15. The latter apparatus acts automatically to successively contract the rings to circular form one at a time and rotates the contracted rings and moves the rings axially past a grinding wheel and discharges the rings therefrom and therefore speeds up this step in the process.

The honing apparatus shown in Figure 6 comprises longitudinally disposed honing stones 57 supported in circular relation in a hollow cylindrical head 59 of a honing machine. This head reciprocates with a variable stroke and rotates or oscillates about the longitudinal axis thereof. The honing stones 57 engage the external peripheral surfaces of a stack up of rings 27 clamped endwise in contracted circular form between a flange 61 on a mandrel 63 and a clamping plate 65 held on one end of the mandrel 63 by a clamping screw 67. The mandrel 63 with the rings 27 clamped thereon is insertable in the space in the head 59 within the honing stones 57 and secured by suitable means, not shown, in stationary coaxial relation within the stones 57 of the oscillatable and variable stroke honing machine head 59. The clamping screw 67 is then loosened to permit the rings 27 to expand into abrading engagement with the circularly arranged honing stones 57 in the machine head. The head 59 and stones 57 are then rotated or oscillated and reciprocated with a short stroke relative to the rings on mandrel 63 while in abrading relation therewith to remove any high spots in the external peripheral surfaces thereof caused by any local stress therein after which the head movement is stopped. The clamping screw 67 is then tightened and the head 59 is then caused to rotate or oscillate and reciprocate with a longer stroke. This causes the rings 27 to rotate or to oscillate slightly with reference to the mandrel 63 and the resulting reciprocation of the stones relative to the rings causes a true cylindrical surface to be formed on the rings 27.

In order to speed up the above step in the process of forming a true cylindrical surface on the contracted rings 27 the apparatus shown in Figures 8 to 15 accomplishes this step in the process automatically, and for this reason is the preferred form of apparatus for carying out this step of the process.

As best seen in Figures 8 to 15 this preferred form of abrading apparatus comprises a frame including a base plate 69 having longitudinally spaced, upstanding ring guiding and supporting members 71, 72, and 73 secured intermediate the ends thereof. These ring guiding members are provided with longitudinally aligned bores 75, 76 and 77 having ring guiding and supporting bushings 79 and 81 removably secured therein. The adjacent, inner end bore portions 83 and 85 of the bushings 79 and 81 have the same bore diameter equal to that of the contracted diameter of the rings 27. The bushings are provided with larger diameter outer end bore portions 87 and 89 to permit axial entrance of the expanded rings and tapered intermediate bore portions 91 and 93 extend between the end bore portions. It will be noted that the bushing 79 is removably supported in the supporting member 71 and this bushing serves as a ring contracting, entrance bushing and the other bushing 81, removably supported in the supporting members 72 and 73, serves as a ring expanding, exit bushing.

The upper portions of the member 71 and the upper half of the outer end bore portion 87 of the entrance bushing 79, as best illustrated in Figure 10, are provided with registering ring entrance slots 95 and 97 slightly larger in width than the width of the rings 27 and having a length equal to the bore portion 87 in the bushing 79 to permit the rings to fall by gravity into this bore portion. A rectangular ring entrance chute 99 having the same inside dimensions as the entrance slot 95 is secured to the member 71 in register with this slot 95 therein.

The outer end of the ring expanding exit bushing 81 is closed off by a plate 101 having a diagonal downwardly extending slot 103 in the inner face to catch the expanded rings falling from this exit bushing. The plate 101 is removably secured to an upstanding portion of a bracket 102 removably secured to the base plate 69, as best seen in Figures 8, 9, 10 and 15. A hollow rectangular ring exit chute 104 is secured to the supporting member 73 in registering relation with the exit slot in the plate 101 and the lower end of the exit chute extends diagonally downwardly therefrom as best seen in Figures 11 and 15. It will be noted that the upper portion of the ring entrance chute 99 also extends diagonally upwardly as best seen in Figure 11 and this diagonal portion is open at the top and serves as a diagonal ring delivery trough.

As best seen in Figures 8 and 9 a ring feeding cylinder 105 is pivotally mounted at one end by means of a vertically disposed pin 107 on an upstanding bracket 109 secured to the base plate 69. A fluid pressure actuated piston is reciprocated in this cylinder and the piston rod portion 111 thereof is shown projecting outwardly of a fluid seal 113 in the other end of the cylinder and the piston rod is pivoted by means of a vertical pin 114 to the outer end of a lever 115, the opposite end of which is pivoted by means of a vertical pin 117 on another bracket 119 secured to the base plate 69. The outer end of a push rod 121 is pivoted by a vertical pin 122 intermediate the ends of the lever 115 and this push rod 121 is reciprocably mounted in a bushing 123 removably secured in the larger outer end bore 87 of the ring entrance bushing 71 and has a ring feeding plunger 125 on the inner end slidable in the bore 87 past the ring entrance slot 97 in the entrance bushing, as best seen in Figure 10.

Suitable reversing valve means, not shown, operable by the fluid actuated piston in the cylinder 105, are provided to apply fluid pressure alternately to opposite ends of the cylinder and control exhaust of fluid pressure from the opposite end of the cylinder. The stroke of the piston and piston rod 111 is limited by adjustable stop screws 124 having a lock nut 124' thereon threaded in separate lugs 126 secured to upstanding bracket 119 attached to the base plate 69. One stop screw 124 is engaged by the outer end of the piston rod 111 on the out stroke of the piston rod which is the ring feeding and contracting stroke of the push rod 121 and ring feeding plunger 125 and the other stop screw 124 is engaged by the outer end of the push rod 121 on the return stroke thereof by the in stroke of the piston and piston rod. The ring feeding plunger 125 at the end of the return stroke of the push rod 121 uncovers the ring entrance slot 97 in the ring entrance bushing 79 to permit one ring to drop therein and this ring is subsequently contracted when moved axially into the tapered bore portion 91 of the entrance bushing on the next inward feeding stroke of the ring feeding plunger 125.

In order to retain the rings contracted to the same diameter as that of the inner end axially aligned bore portions 83 and 85 of the entrance and exit bushings 79 and 81 and to cause rotation of the rings when fed axially between these bore portions by the feed plunger 125, ring supporting and guiding rollers 127 and stationary ring guiding means indicated generally by the reference characters 129 are disposed in a circle around the adjacent inner ends of the bushings 79 and 81 between the upstanding members 71 and 72.

Figure 12:
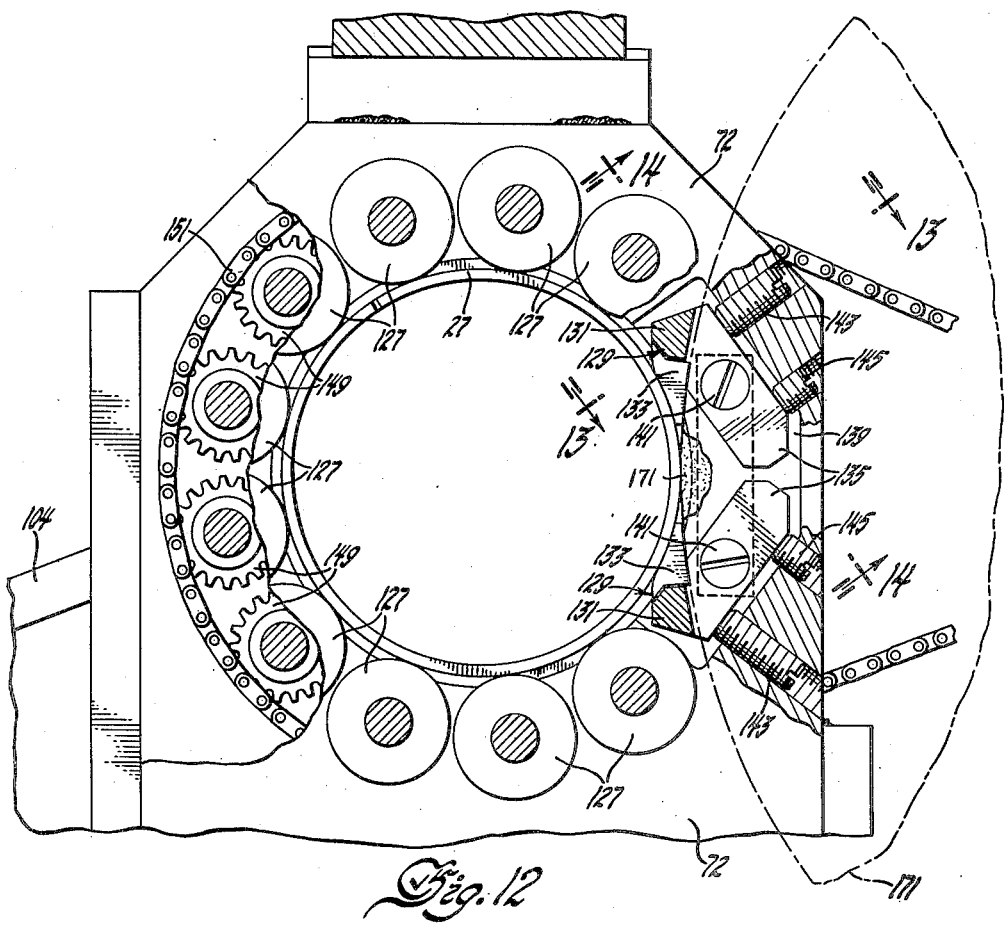
Figure 12 is a transverse, sectional view taken on line 12—12 of Figure 10 with parts shown broken away and in section.
Figure 13:
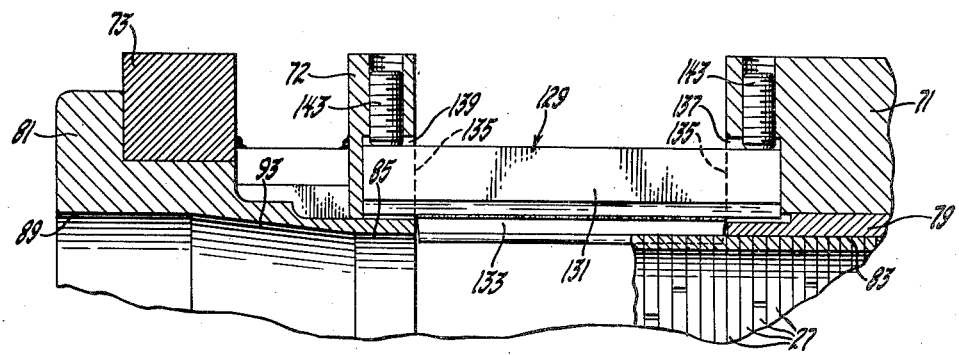
Figure 13 is a sectional view taken on line 13—13 of Figure 12 with parts shown broken away and in section.

As best seen in Figure 12, the stationary ring guiding means 129 are located on one side of the bushings 79 and 81 above and below the horizontal median plane thereof and the rollers 127 are spaced around the remainder of the circumference of the inner ends of the bushings 79 and 81. As best seen in Figures 12, 13 and 14 each of these stationary guiding means 129 include a strut 131 provided with an attached wear resistant shoe 133 having an arcuate ring engaging guiding surface extending between the adjacent inner ends of the bushings 79 and 81. The strut 131 is provided with end support portions 135, extending at right angles therefrom and located in recesses 137 and 139 provided in the adjacent end faces of the members 71 and 72. Aligned openings are provided in the end portions 135 of each strut 131 and pivot pins 141 extend therethrough and are shown threaded at the inner ends and screwed into separate threaded openings in the member 71 and a member 142 secured between members 72 and 73.

Set screws 143 and 145 are screwed in threaded openings extending inwardly from the sides of the members 71 and 72 into the recesses 137 and 139 therein and engage the end portions 135 of each strut on opposite sides of the pivot pins 141. By adjusting the set screws 143 and 145 the struts 131 and shoes 133 may be angularly with respect to the pivot pins and thus positioned radially inwardly or outwardly with respect to the openings in the bushings 79 and 81. After proper adjustment of the shoes 133 the pivot pins 141 are tightened to retain this adjustment. As best seen in Figure 10, each of the rollers 127 is provided with reduced diameter outer end journal portions rotatably supported in needle bearings 147 carried in aligned counterbores and openings in the members 71 and 72. The axes of these counterbores and openings for these needle bearings 147 are disposed in a circle about the axis of the aligned bore portions 83 and 85 in the bushings 79 and 81 and the rings fed axially through these bore portions will pass axially between the rollers 127 and the guiding shoes 133 of the stationary ring guiding means and the ring will be retained in contracted circular form of the same diameter as these bore portions by frictional engagement with the rollers and shoes when the shoes are in proper adjustment.

As best seen in Figures 10 and 12, a sprocket 149 is secured to the end of each roller journal portion projecting through each opening in the member 72 and a driving chain 151 connects each of these sprockets 149 to a sprocket 153 secured on a driven shaft 155, shown in Figures 8 and 11, projecting from a gear box 157 on the base mounted on a bracket 158 on the base plate 69. The gear box includes a gear train, as best seen in Figure 8, and a driving shaft 159 projects from the gear box 157 and has a pulley 161 thereon connected by a belt 163 to a pulley 165 secured on the end of a driving shaft 167 of a motor 169 to rotate the rollers 127 and the split resilient rings in frictional engagement therewith in accordance with the speed of the motor 169 when fed axially by the plunger 125 through the rollers 127 and stationary shoes 133 between the ring entrance and exit bushings 79 and 81.

A grinding wheel 171, shown partly in full lines and partly in dash-and-dotted lines in Figures 8, 9, 10, 11, and 12 is rotatable about an axis parallel to and alongside the axes of the bushings 79 and 89 and as best shown in Figures 10, 11 and 12, the grinding wheel 171 is fed radially inwardly between the members 71 and 72 and engages the external peripheral surfaces of the rotating rings at a point intermediate the ring guiding shoes 133 which have arcuate recesses in the outer faces to permit this engagement of the rings by the grinding wheel 171. The grinding wheel 171 is set relative to the rotating rings so that as they are fed axially past the wheel a true cylindrical surface is formed on the external peripheral surface thereof and the formed rings then pass through the exit bushing 81, fall into the slot 103 in the plate 101 and roll outwardly through the exit chute 105 as best seen in Figure 15.

After a true cylindrical surface has been formed on the external peripheral surface of the rings they are secured on a suitable mandrel and the end surfaces are milled and the outer edges of these surfaces are chamfered.

The rings are then clamped and contracted in circular form on a plating mandrel serving as a plating cathode and immersed in a plating bath and the external peripheral surfaces are plated with chromium or other material.

After plating of the rings the plated external peripheral surfaces are finished by the preferred form of apparatus shown in Figures 8 to 15 or by means of the honing apparatus shown in Figure 6.

After finishing of the rings they are successively de-greased, inspected, rust proofed and packed for shipment.

The preferred form of apparatus shown in Figures 8 to 15 automatically performs the step of abrading a true cylindrical surface on an oval, split resilient packing ring whereby the ring is formed to the shape it is to be used and the external peripheral surface of the ring uniformly engages the wall of a cylinder and the ring sides uniformly engage the sides of the grooves of a piston slidable in the cylinder.

We claim:

1. In a ring grinding apparatus, a frame including a support having an axially inwardly tapering circular ring entrance, ring feeding means movable axially with respect to the ring entrance, rotary ring driving means arranged in a circle around the outlet of the ring entrance, and a grinding wheel engageable with driven rings said apparatus beyond said ring driving means being formed to provide a ring outlet.

2. In a split ring grinding apparatus, a frame including a support having an enlarged ring entrance bore, a ring entrance slot opening therein and a tapered ring contracting surface adjacent the entrance bore, reciprocating ring feeding means in the entrance bore uncovering the entrance slot, rotary ring driving means disposed in a circle about the exit of the contracting surface of the entrance bore about the axis thereof and a rotatable grinding wheel engageable with rotating rings.

3. In a grinding apparatus for split resilient rings, a frame including a support member having a cylindrical bore provided with an inwardly tapered ring contracting surface, ring feeding means movable axially with respect to the ring contracting surface, spaced rotary ring driving means arranged in a circle around the outlet of the contracting surface engaging the contracted rings fed therethrough for rotating the contracted rings and a grinding wheel rotatable about an axis parallel to the bore axis and engageable with the external peripheral surfaces of the contracted rotating rings.

4. In a split ring grinding apparatus, a frame including a support having a ring receiving bore, a ring entrance slot opening in the bore and a tapered ring contracting surface adjacent the bore, a ring delivery chute communicating with the ring entrance slot, ring driving rollers arranged in a circle around the outlet of the ring contracting surface, a rotary grinding wheel adapted to be positioned to engage rings supported by said rollers, and ring feeding means reciprocable past the ring entrance slot in the ring receiving bore for moving the rings through the ring contracting surface and rollers for engagement by the grinding wheel.

5. In a split ring grinding apparatus, a frame having a ring receiving bore tapering axially inwardly to contract the rings, stationary and rotary ring engaging means spaced in a circle around the smaller diameter end of the tapered receiving bore, a rotary grinding wheel adapted to be disposed between said stationary ring engaging means, and ring feeding means movable axially with respect to the bore for moving contracted rings through the rotary and stationary ring engaging means.

6. In a split ring grinding apparatus, a frame including spaced parallel support members having aligned circular ring openings, one opening tapering inwardly toward the adjacent end of the other opening, ring feeding means reciprocally movable relative to the tapered opening, rotary ring driving rollers disposed in a circle between the adjacent ends of the openings about the axis of the openings, and a rotary grinding wheel engageable with the external peripheral surfaces of contracted rings fed axially by the ring feeding means through the rollers from the tapered ring opening to the other ring opening.

7. In an oval split ring grinding apparatus, a frame including spaced support means having axially aligned ring entrance and exit openings of circular form, the entrance opening tapering inwardly toward the end of the ring entrance opening and a diametrical ring entrance slot opening into the upper portion of the ring entrance opening, ring engaging means reciprocally movable past the ring entrance slot in the entrance opening for contracting the oval rings into circular form and feeding the rings through the aligned openings, ring engaging means spaced in a circle around the adjacent ends of the entrance and exit openings for receiving the contracted rings fed axially therethrough, said ring engaging means comprising adjacent stationary shoes and ring driving rollers and a rotary grinding wheel engageable with the driven contracted rings at a point between the adjacent shoes.

8. In an oval split ring grinding apparatus, a frame including spaced parallel supports having aligned ring entrance and exit openings, the entrance opening tapering inwardly toward the exit opening and having an upper diametrical ring entrance slot, ring feeding means reciprocally movable past the entrance slot in the entrance opening for contracting the oval rings into circular form and feeding the rings into the exit opening, ring engaging means spaced in a circle around the adjacent ends of the entrance and exit openings for retaining the rings fed therebetween in contracted form, said ring engaging means comprising adjacent radially adjustable ring engaging shoes and rotary ring driving rollers for rotating the contracted rings and a grinding wheel rotatable about an axis parallel to the aligned entrance and exit openings and engageable with the ring surface engaged by the shoes at a point intermediate the shoes.

9. In an oval split ring grinding apparatus, a frame including spaced supports having circular aligned ring entrance and exit openings tapering inwardly toward the adjacent ends, ring engaging means spaced in a circle between the adjacent ends of the entrance openings, said ring engaging means comprising adjacent ring guiding shoes supported for radial adjustment with respect to the axis of the openings on the supports and ring driving rollers rotatably supported at the ends in the supports about axes parallel to the axis of the aligned openings, the ring engaging surfaces of the shoes and rollers being located in a circle of substantially the same diameter as the adjacent ends of the ring entrance and exit and entrance surfaces, ring feeding means reciprocatable with respect to the entrance openings for moving the rings between the entrance and exit openings and through the ring guiding shoes and ring guiding rollers and a grinding wheel engageable with the driven rings intermediate the ring guiding shoes.

10. The process of forming split resilient rings which comprises moving a ring in one direction along the axis of the ring, progressively contracting the ring during an initial part of such movement to gradually internally stress the ring in tension and compression and throughout the length thereof, rotating the ring on said axis and during an intermediate part of such movement and while said ring is so internally stressed, uniformly abrading a surface of said ring and throughout the length thereof and while said ring is being so moved and so rotated and so internally stressed, and thereafter progressively expanding said ring during a final part of such movement and after said abrading is completed and to gradually release the internal stresses therein.

11. A process of forming split resilient rings which comprises moving a stack of rings in one direction along the axis of the stack, progressively contracting the rings in said stack during the initial part of such movement to gradually and successively internally stress the rings in said stack in tension and compression and throughout the length of each ring, rotating a part of said stack about said axis and during an intermediate part of such movement and while said rings in said part of said stack are so internally stressed, uniformly abrading a surface of each of said rings in said part of said stack and throughout the length of each ring and while the rings in said part of said stack are being so moved and so rotated and so internally stressed, and thereafter progressively expanding said rings in said stack during a final part of such movement and to gradually and successively release the internal stresses in the rings of said stack.

GEORGE R. SQUIBB.
DONALD ALLEN URQUHART.

References Cited in the file of this patent

UNITED STATES PATENTS

| Number | Name | Date |
|---|---|---|
| 560,250 | Wesson | May 19, 1896 |
| 1,219,440 | Clark | Mar. 20, 1917 |
| 2,191,930 | Arms et al. | Feb. 27, 1940 |
| 2,463,563 | Robinson | Mar. 8, 1949 |
| 2,501,659 | Bates | Mar. 28, 1950 |
| 2,530,615 | Hutto | Nov. 21, 1950 |

FOREIGN PATENTS

| Number | Country | Date |
|---|---|---|
| 543,171 | Germany | Feb. 1, 1932 |